(12) United States Patent
Stoddard et al.

(10) Patent No.: US 7,634,239 B2
(45) Date of Patent: Dec. 15, 2009

(54) GENERATOR FOR AGILE FREQUENCY SIGNALS

(75) Inventors: Robert Eugene Stoddard, Sunnyvale, CA (US); Michael Shaw McKinley, Sunnyvale, CA (US)

(73) Assignee: Aeroflex High Speed Test Solutions, Inc, Powell, OH (US)

( * ) Notice: Subject to any disclaimer, the term of this patent is extended or adjusted under 35 U.S.C. 154(b) by 857 days.

(21) Appl. No.: 10/812,227

(22) Filed: Mar. 29, 2004

(65) Prior Publication Data

US 2005/0215208 A1    Sep. 29, 2005

(51) Int. Cl.
*H04B 17/00* (2006.01)

(52) U.S. Cl. .................. 455/115.2; 455/115.1; 455/425; 375/224; 379/27.04

(58) Field of Classification Search ......... 455/423–425, 455/453, 115.1, 115.2; 375/132, 135, 149, 375/146, 147, 224; 379/21, 26.01, 27.01–27.04
See application file for complete search history.

(56) References Cited

U.S. PATENT DOCUMENTS

| | | | |
|---|---|---|---|
| 4,168,502 A | 9/1979 | Susie | |
| 5,117,230 A | 5/1992 | Wedel | |
| 6,058,261 A | 5/2000 | Rapeli | |
| 6,075,480 A | 6/2000 | Deliberis | |
| 6,112,067 A | 8/2000 | Seike et al. | |
| 6,128,474 A | 10/2000 | Kim et al. | |
| 6,243,576 B1 | 6/2001 | Seike et al. | |
| 6,307,879 B1 | 10/2001 | Moriyama | |
| 6,438,357 B1 | 8/2002 | Oh et al. | |
| 6,961,317 B2 * | 11/2005 | Abramovitch et al. | ...... 370/252 |
| 7,023,905 B2 * | 4/2006 | Farine et al. | ................. 375/150 |
| 7,062,264 B2 * | 6/2006 | Ko et al. | ..................... 455/423 |
| 7,088,671 B1 * | 8/2006 | Monsen | ....................... 370/203 |
| 2004/0037353 A1 * | 2/2004 | Henriksson | .................. 375/224 |
| 2004/0062298 A1 * | 4/2004 | McDonough et al. | ....... 375/150 |
| 2004/0062300 A1 * | 4/2004 | McDonough et al. | ....... 375/150 |
| 2004/0070490 A1 * | 4/2004 | Taki et al. | ................... 340/10.1 |
| 2004/0128603 A1 * | 7/2004 | Reberga | ...................... 714/738 |

OTHER PUBLICATIONS

Agilent, E4438C ESG Vector Signal Generator, Data Sheet Published: http://cp.literature.agilent.com/litweb/pdf/5988-4039EN.pdf (pp. 1-40) Published Mar. 18, 2004 or earlier.
Agilent, E8267C PSG Vector Signal Generators Published: http://cp.literature.agilent.com/litweb/pdf/5988-6632EN.pdf (pp. 1-24) Published Mar. 18, 2004 or earlier.
Rohde&Schwarz, Tektronix, Vector Signal Generator R&S SMIQ-Specification(pp. 1-32) Published Mar. 18, 2004 or earlier.

* cited by examiner

*Primary Examiner*—Nhan T Le
(74) *Attorney, Agent, or Firm*—David E. Lovejoy

(57) ABSTRACT

The subject of this patent is a system to generate RF frequency hopped signals that can be used to test radio receivers over the range of their signal specifications. The hop sequence and symbols in the signal is decoded from signals transmitted by the same or different radio of the same specification. The system can set various signal parameters to any prescribed value. These parameters include carrier frequency error, bit rate error, rise and fall times, amplitude ripple and roll off, modulation depth, nonlinearities, burst duration, burst start time and burst interval. Signal interference can be added to the signal including tones, other signals, noise and other signals of the same as the test radio. Similarly other communications equipment can be tested by the combination of receiving and demodulating a transmitted and regenerating the signal with the same symbols with specified signal parameters.

42 Claims, 9 Drawing Sheets

GENERATOR FOR AGILE FREQUENCY SIGNALS

BACKGROUND OF THE INVENTION

The present invention relates to methods and apparatus for generating and transmitting agile frequency test signals, such as frequency hopped signals, to receivers under test and particularly to provide test signals that enable testing of receiver performance beyond nominal receiver performance.

Agile frequency signals are signals that have rapidly changing frequency and time characteristics and include, for example, frequency hopping signals. Frequency hopping is a form of spread-spectrum signaling where, for short instances of time, relatively narrowband signals are transmitted as short bursts with the carrier frequency for each burst tuned to a different one of a set of carrier frequencies than the ones of the carrier frequencies used for the previous burst and the next burst. The sequence of frequencies that is used for a sequence of bursts is known as the hopping sequence. The carrier frequency transmission at any particular instant of time for one burst is therefore different than the carrier frequency transmission at the previous instant of time for the previous burst and similarly is different than the carrier frequency transmission at the next instant of time for the next burst. While the bandwidth for any particular burst may be narrow, the bandwidth for the whole set of frequencies in the hopping sequence can be very large. Typically a frequency hop system hops over a bandwidth many times the bandwidth of the individual hop signal bandwidth. Bluetooth for example has a 1 MHz signal bandwidth and hops over 80 MHz. Some military radios have a 25 kHz signal bandwidth with thousands of hop frequencies covering over 50 MHz. The frequency hoppers in use today hop over at least 8 times the bandwidth of the signal bandwidth.

Frequency hopping systems with changing frequency transmissions have a number of advantages over the fixed frequency transmissions of non-hopping systems. If a particular hop frequency, in the set of frequencies used in a hopping sequence, happens to include a frequency that is regularly occupied by another interfering radio signal, the frequency hopping system detects the occupied status and functions to retransmit the burst of data at a different frequency. Also, the frequency hopping system detects the regularly occupied frequencies for any particular installation and reestablishes a hopping sequence that excludes the occupied frequency from the set of frequencies in the hopping sequence.

Frequency hopping systems are more secure than fixed frequency systems because the interception of frequency hopped signals is significantly more difficult than interception of fixed frequency signals, particularly when the hopping sequence is not known in advance. If a communication protocol is intended to be secure, such as in military and other secure environments, the hopping sequence and other protocol, specification and standards information is not published and is changed from time to time to support secure operation.

In any environment, the characterization of radios and radio wave signals for frequency hopped systems is difficult because they operate and function over broad bandwidths and because each burst at a particular frequency is of relatively short duration. The characterization of signals for frequency hopped systems is even more difficult when done in a secret environment where the protocol, specification, standards, hopping sequence and other characterizing information is not fully known in advance. A secret environment is common since manufacturers and users of frequency hopping systems often wish to maintain their protocols, specifications, standards and hopping sequences confidential and unpublished.

As the complexity of radios increases, the ability to adequately test the radios becomes more difficult. One common test procedure employs a "golden radio". A golden radio is a radio that operates "nominally", where "nominally" is loosely defined to mean an "average", a "mean" or an "expected" operation. Each radio under test (test radio) is tested to ensure acceptable communication with the golden radio. If a test radio communicates well with the golden radio, then the test radio is accepted and if not, the test radio is rejected. This golden radio test method is limited because in actual use, radios will communicate with other radios that do not behave nominally. Large failure rates (for example, as high as 30%) often result in actual use when only golden radio testing is employed.

Other common test procedures employ test equipment in the form of signal generators for generating test signals for testing radios where the test signals are selected to have nominal values determined, for example, from specifications established for the transmit and receive characteristics of the test radios. Test equipment such as the Agilent E4438C, Agilent E8267C and the Tektronix SMIQ series can generate transmit signals to test standard wireless communications system such as 2, 2.5 and 3G cellular telephone systems and 802.11 wireless networks. The Tektronix SMIQ can generate a Bluetooth frequency hopped signal over a frequency band, but the band is narrower than the specified 80 MHz available for Bluetooth. All of these signal generators use symbols that are either random in nature or specified in the standard to produce a known test signal. These test systems do not achieve satisfactory testing since they do not adequately test the range of operation actually encountered by radios in a real environment where many radios having some non-nominal characteristics (all having passed nominal tests, however) fail to communicate satisfactorily.

Because of the difficulty of testing frequency hopping radios, the above and many other systems employ "hop-in-place" analysis where the test does not occur with frequency hopping or even if some hopping occurs, the hopping is not permitted to extend over the full hopping bandwidth available. These systems, therefore, do not adequately test frequency hopping radios.

It is desired to test the radios with transmitted signals having signal parameters that cover the range of the specified values and tolerances of the radios with accurate control over the signal attributes including sequences, symbols and parameters.

Various signal simulators have been proposed that deal with the transmission problems encountered in communications. U.S. Pat. No. 6,438,357 simulates the path loss encountered in the transmission of cellular telephone signals. U.S. Pat. No. 6,307,879 provides a method of compensating for distortion in the radio transmission process. U.S. Pat. No. 6,058,261 simulates Doppler, delay, multipath and delay spread encountered in the transmission process. None of these patents discuss changing the fundamental transmitted signal parameters to represent the range of parameters that are present when many different radios are communicating in actual operation in a non-test environment. While changes in the carrier frequency have been implemented by simulating Doppler, such a change is limited and does not allow change of frequency over the range of operation permitted by the specification for the radio. In the case of frequency hopped signals, the inadequacy is even greater since the carrier frequency changes for each hop.

U.S. Pat. No. 6,128,474 tests the diversity reception of a multiple antenna radio. U.S. Pat. Nos. 6,243,576 and 6,112,067 discuss a standard stimulus/response test system where the system transmits a known signal to a test device, such as a cellular telephone, and receives the response signal transmitted by the test device to ensure the test device properly received and processed the test signal. While these systems test against the known signal, such systems do not test the range of signals likely to be encountered in a real environment.

Other systems simulate signals for testing radars. U.S. Pat. No. 6,075,480 covers a system to simulate Doppler shift on complex radar signals. U.S. Pat. No. 5,117,230 records and plays back radar signals using signal processing to simulate the target encounter. U.S. Pat. No. 4,168,502 simulates a radar signal digitally to simulate a range of target velocity and acceleration. None of these patents deal with changing the signal parameters over the range of the radio specification other than those unique to the changes encountered in the transmission/reception process and hence they do not deal with the actual parameter variations from radio to radio in real communication systems.

The known test systems provide limited testing of radios without adequately testing the range of variables likely to be encountered in communications systems and therefore, they are not fully adequate for the communication industry.

Accordingly, in order to meet the demands of the communication industry, improved methods and apparatus are needed for generating agile frequency signals for broadband systems.

SUMMARY

The present invention is a transmitter for an agile frequency test signal for testing a receiver of a test radio. The transmitter includes a signal component source for providing a test sequence for the test signal, test symbols for the test signal and test parameters for the test signal. A signal generator digitally processes the test sequence, the test symbols and test parameters to form the test signal and the transmitter transmits the test signal to the receiver of the test radio. The test signals are generated with specified and known signal parameter values that enable testing of the receivers using the modulation method employed by the communication system of the receiver and for performance beyond nominal performance established by receiver specifications.

In one embodiment, the agile frequency test signals are transmitted and the receiving radio is monitored to judge the proper functionality in response to the test signals. The test radio is typically a frequency hop radio receiver and the test signal is a frequency hopped signal that has been generated with signal parameters at specified and known values. Also, digital signal processing is used to modulate the signal carrier with message symbols using the modulation method employed by the communication system.

In one embodiment, the system receives a signal from a transmitter and demodulates the received signal to recover the message symbols. The system then uses these recovered symbols to regenerate the test signal with specified signal parameters. In the case of frequency hop signals, the demodulating process also measures the hop frequencies so that the regenerated test signals hop with the recovered hopping sequence, that is, the test signal has the same frequency hop channels and the same message symbols as the original transmitted signal.

The parameters that are specified will vary with each modulation type and radio specification. Common parameters include carrier frequency, frequency drift, modulation parameters, interference signals and amplitude ripple.

In the case of digital communication signals, the parameters also include symbol rate and clock jitter. In the case of burst signals like TDMA and frequency hopped signals, the parameters include burst duration, interval, timing, burst frequency and frequency error.

The steps in the process are: a) the radio transmits a message that is intercepted by the signal collection and analysis part of the system b) the signal is demodulated to recover the hop frequencies and the message symbols, c) these hop frequencies, message symbols and user input on signal parameter values are used to regenerate the signal, d) the signal is retransmitted and e) the receiver function is monitored to verify the receiver is functioning properly. The transmit and receive test radios may be the same or different radios of the same specification.

The signal generation includes in some embodiments adding in interference signals and noise to provide a known, calibrated way to simulate the effects of the signal being transmitted via antennas. In addition in some embodiments, the signal is faded to simulate the signal amplitude variations due to a moving radio receiver. Similarly, signal processing is used to impart the effects of multipath interference on the signal.

This test of the test radio in one embodiment is an operator speaking into the microphone of the test radio transmitter, the system receiving and regenerating the signal and the operator listening to the test radio receiver to verify that the operator's message is heard on the radio speaker.

In another test, the signal from a defective radio is received, recorded and analyzed. The analysis determines signal problems. These problems include, for example, close-in interference or spurs, amplitude ripple, precarriers and bad rise/fall characteristics. These types of problems can exist individually or in any combination. To determine the impact of these types of problems on the radio performance, especially when multiple problems exist simultaneously, the problems are isolated and selectively removed using digital signal processing to form one or more corrected signals. The resultant corrected signals are transmitted to determine the radio performance in response to the corrected signals. The sequencing of the corrected signals is used to determine which ones, and possible all, of the problems are adversely affecting performance of the receiving radio.

The foregoing and other objects, features and advantages of the invention will be apparent from the following detailed description in conjunction with the drawings.

DETAILED DESCRIPTION

Figure 1:
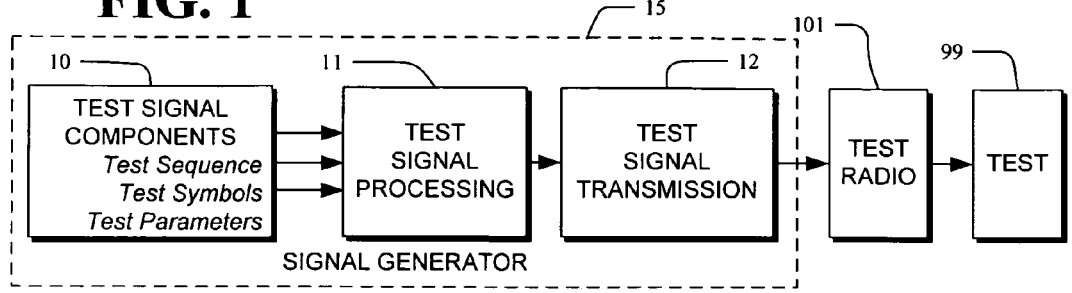
FIG. 1 is a block diagram showing the test signal components used for test signal generation and test signal transmission.

FIG. 1 is a block diagram showing the signal generator 15 with test signal components 10 used for test signal processing 11 and test signal transmission 12. The test signal transmission 12 transmits an agile frequency test signal for testing a radio under test (test radio) 101. The test radio 101 is analyzed by test 99 to determine acceptable or non-acceptable performance in response to the agile test signal. The transmitter includes a source for the test signal components 10 that provides a test sequence for the test signal, test symbols for the test signal and test parameters for the test signal. The test signal processing 11 digitally processes the test sequence, the test symbols and test parameters to form the test signal. The test signal transmission 12 transmits the test signal to the receiver of the test radio. The test signals are generated with specified and known values that enable testing of the receiver and radios under test using the modulation method employed by the communication system of the radios under test and the testing is for performance beyond nominal performance. The agile frequency test signals transmitted by the test signal transmission 12 to the receiving radio are monitored to test the proper functionality of the receiving radio in response to the test signals. The test radio is typically a frequency hop radio and the test signal is a frequency hopped signal that has been generated with signal parameters at specified and known values. Also, digital signal processing is used to modulate the signal carrier with message symbols using the modulation method employed by the communication system.

Figure 13:
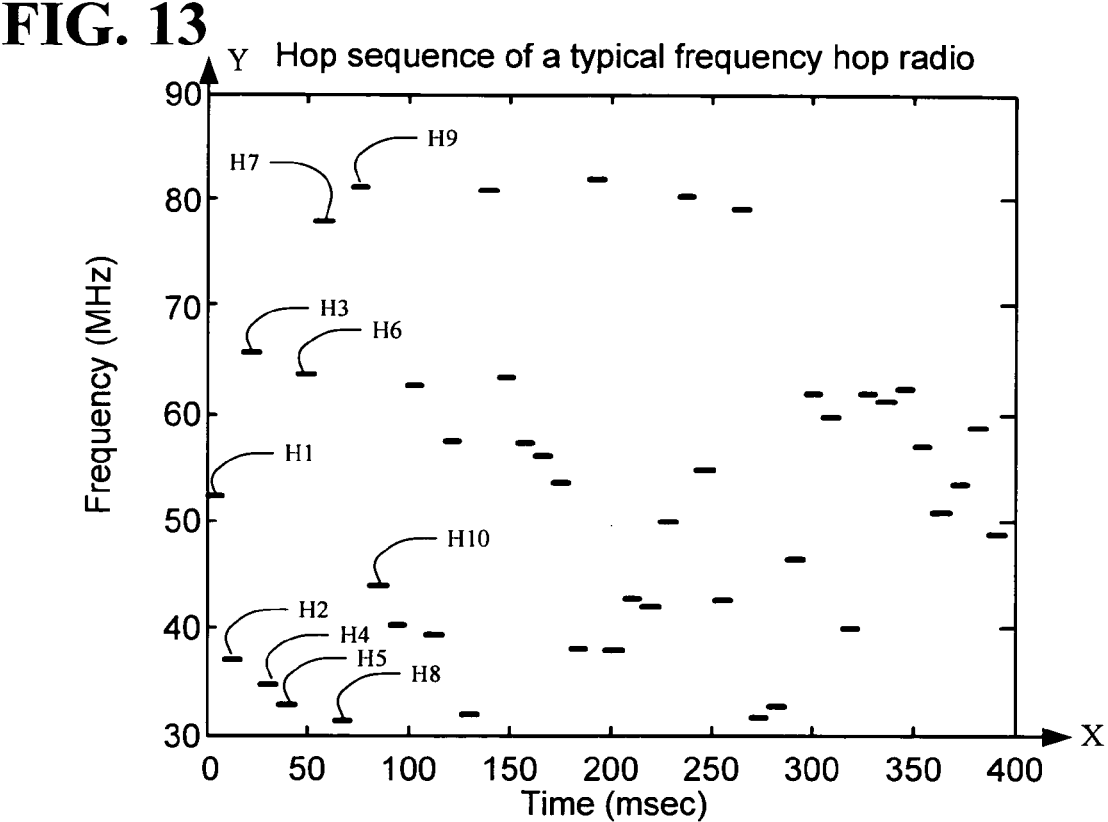
FIG. 13 is a representation of a typical hop sequence showing frequency vs. time.

A typical frequency hopping sequence used by the radio 101 is shown in FIG. 13. The signal of FIG. 13 shows the signal time on the X axis and the signal frequency on the Y axis. The hopping sequence for the first ten hops in FIG. 13 is indicated in the following TABLE 1 as H1, H2, ..., H10. For clarity, FIG. 13 does not represent the amplitude of the signals at the different hop frequencies.

TABLE 1

| HOP | $f_c$ (MHz) |
|---|---|
| H1 | 52 |
| H2 | 38 |
| H3 | 67 |
| H4 | 34 |
| H5 | 32 |
| H6 | 64 |
| H7 | 79 |
| H8 | 31 |
| H9 | 81 |
| H10 | 44 |

Figure 14:
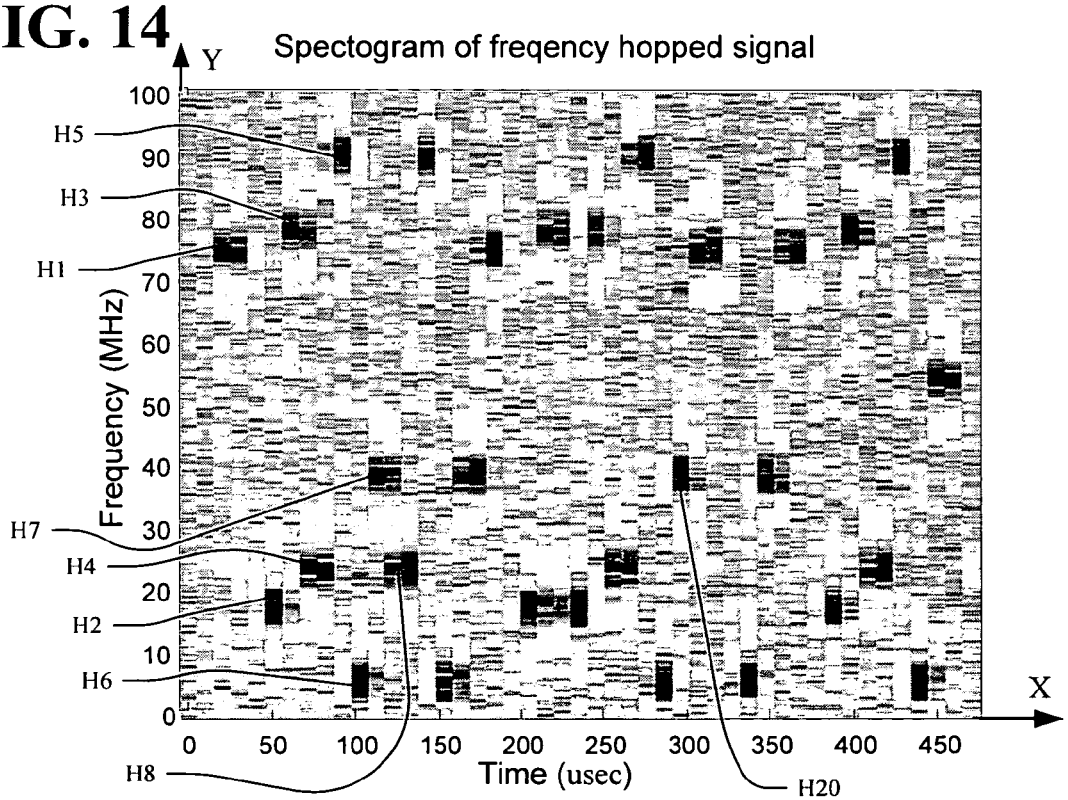
FIG. 14 is a spectrogram of a typical hop sequence showing frequency vs. time with signal power indicated by image intensity.

Another typical frequency hopping sequence for radio 101, the device under test, is shown in FIG. 14. The signal of FIG. 14 shows the signal time on the X axis and the signal frequency on the Y axis and the signal power in the image intensity. The signal of FIG. 14 is unique in that the hop bandwidth is greater than the channel frequencies. The hopping sequence for the first twenty hops in FIG. 14 is indicated in the following TABLE 2 as H1, H2 ..., H20.

TABLE 2

| HOP | $f_c$ (MHz) |
|---|---|
| 1 | 75 |
| 2 | 18 |
| 3 | 78 |
| 4 | 24 |
| 5 | 90 |
| 6 | 6 |
| 7 | 39 |
| 8 | 24 |
| 9 | 90 |
| 10 | 6 |
| 11 | 39 |
| 12 | 75 |
| 13 | 18 |
| 14 | 78 |
| 15 | 18 |
| 16 | 78 |
| 17 | 24 |
| 18 | 90 |
| 19 | 6 |
| 20 | 39 |

Figure 2:
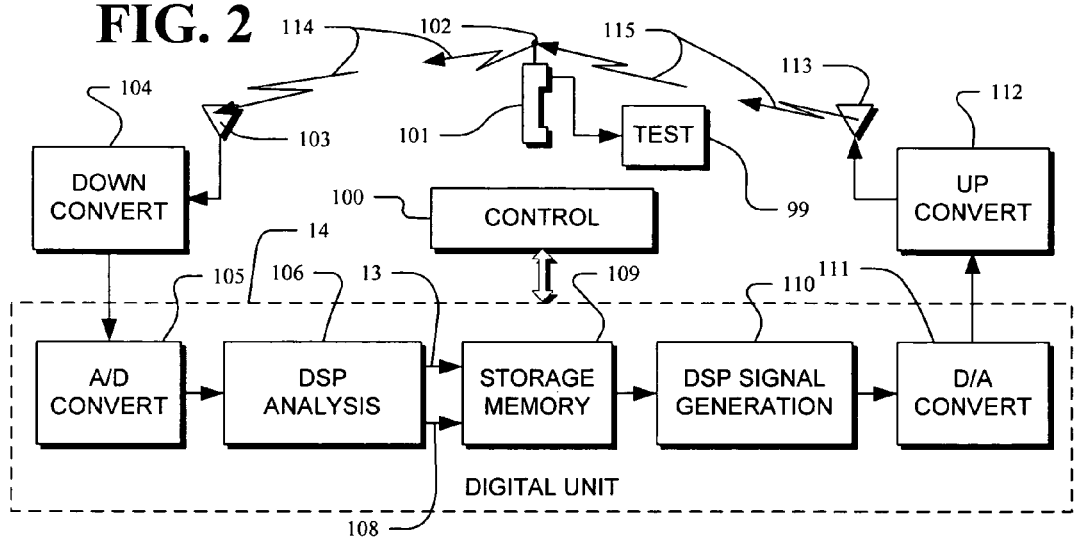
FIG. 2 shows a transmitter and receiver in the same radio where the transmitter provides the source of test signal components and the receiver receives the test signals generated from the test signal components.

FIG. 2 is an example of the FIG. 1 system where a transmitter and receiver are in the same radio 101 and the radio 101 communicates through an air interface. In FIG. 2 in the first step, the radio 101 transmits a signal 114 to the system down converter 104 via antennas 102 and 103. The down converter 104 has sufficient bandwidth to capture the entire frequency range of the signal 114. In the case of a frequency hop signal, the down converter will have the bandwidth to capture all of the hop frequencies of interest for the radio communication system under test.

The IF output of the converter 104 is digitized with A/D converter 105. The down converter band limits the IF signal to reduce aliasing in the A/D converter 105 to an acceptable level. The sample rate is at least twice the highest frequency of the frequency hopped signal with enough bits of resolution to provide the dynamic range to permit analysis.

If the input signal 114 is transmitted at a low radio frequency, the down converter 104 is not necessary. For example, if the highest frequency of the input signal is 30 MHz, the received signal may be sampled directly with a sample rate of 60 Msamples/second or higher to obey the Nyquist criteria. Similarly, alias sampling can be used for signal frequencies that are greater than half the sample rate. For example, if the input signal 114 is from 110-125 MHz, the input signal can be sampled at 100 Msamples/second to create a digitized signal on the output of the A/D converter 105 of FIG. 2 from 10-25 MHz.

The digital signal is processed with the digital signal processing (DSP) analysis 106 to extract the frequency, symbols and other information. In the case of a frequency hopped signal, this extraction is done independently on each hop.

The storage memory 109 stores the test signal components including a test sequence that is determined by the sequence of each different frequency, test symbols and test parameters determined by the DSP analysis 106. The digital signal processing (DSP) generator 110 digitally processes the test sequence, the test symbols and test parameters to form an agile test signal. The test parameters and other inputs are provided in some embodiments by the control 100. If the highest transmitted RF signal frequency is lower than half of the D/A sample rate, up converter 112 is not needed. The agile test signal is D/A converted in D/A converter 111, up-converted in up-converter 112 and transmitted over the air interface by antenna 113 to antenna 102 of the test radio 101. The agile test signals are generated with specified and known values that enable testing of the radio 101 using the modulation method employed by the communication system of the radio 101 and the testing is for performance beyond nominal performance. The agile frequency test signals transmitted to the receiving test radio 101 are monitored by test 99 to test the proper functionality of radio 101 in response to the test signals. The radio 101 is typically a frequency hop radio and the test signal is a frequency hopped signal that has been generated with signal parameters at specified and known values.

Figure 3:
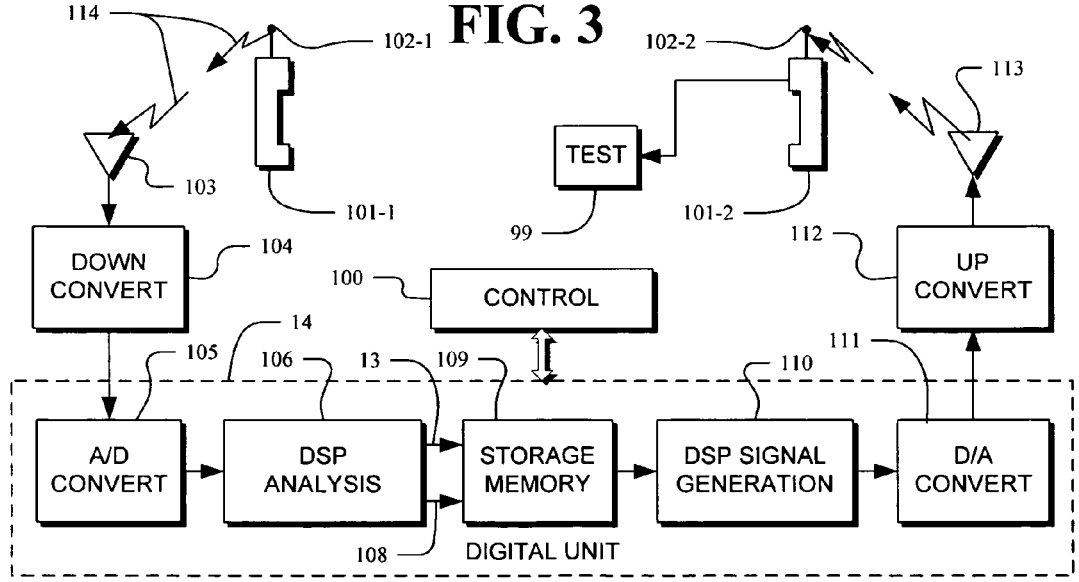
FIG. 3 shows a transmitter and receiver in different radios of the same specification where the transmitter provides the source of test signal components and the receiver receives the test signals generated from the test signal components.

FIG. 3 shows a transmitter and receiver in different radios, radios 101-1 and 101-2, of the same specification. The transmitter of radio 101-1 provides the source of test signal components and the receiver of radio 101-2 receives the agile frequency test signals generated from the test signal generator.

The radios 101-1 and 101-2 communicate through an air interface. In FIG. 3 in the first step, the radio 101-1 transmits a signal 114 to the system down converter 104 via antennas 102-1 and 103. The down converter 104 has sufficient bandwidth to capture the entire frequency range of the signal 114. In the case of a frequency hop signal, the down converter will have the bandwidth to capture all of the hop frequencies of interest for the radio communication system under test.

The IF output of the converter 104 is digitized with A/D converter 105. The down converter band limits the IF signal to reduce aliasing in the A/D converter 105 to an acceptable level. The sample rate is at least twice the highest frequency of the frequency hopped signal with enough bits of resolution to provide the dynamic range to permit analysis.

If the input signal 114 is transmitted at a low radio frequency, the down converter 104 is not necessary. For example, if the highest frequency of the input signal is 30 MHz, the received signal may be sampled directly with a sample rate of 60 Msamples/second or higher to obey the Nyquist criteria. Similarly, alias sampling can be used for signal frequencies that are greater than half the sample rate. For example, if the input signal 114 is from 110-125 MHz, the input signal can be sampled at 100 Msamples/second to create a digitized signal on the output of the A/D converter 105 of FIG. 3 from 10-25 MHz.

The digital signal is processed with the digital signal processing analysis 106 to extract the frequency 13 and symbols 108. In the case of a frequency hopped signal, this extraction is done independently on each hop.

The storage memory 109 stores the test signal components including a test sequence that is determined by the sequence of each different frequency 13, test symbols 108 and test parameters determined by the DSP analysis 106. The digital signal processing (DSP) generator 110 digitally processes the test sequence, the test symbols and test parameters to form an agile test signal. The test parameters and other inputs are provided in some embodiments by the control 100. If the highest transmitted RF signal frequency is lower than half of the D/A sample rate, up converter 112 is not needed. The agile test signal is D/A converted in D/A converter 111, up-converted in up-converter 112 and transmitted over the air interface by antenna 113 to antenna 102-2 of the test radio 10-2. The agile test signals are generated with specified and known values that enable testing of the radio 101-2 using the modulation method employed by the communication system of the radios 101-1 and 101-2 and the testing is for performance beyond nominal performance. The agile frequency test signals transmitted to the receiving test radio radios 101-2 is monitored by test 99 to test the proper functionality of radio 101-2 in response to the test signals. The radios 101-1 and 101-2 are typically frequency hop radios and the test signal is a frequency hopped signal that has been generated with signal parameters at specified and known values.

Figure 4:
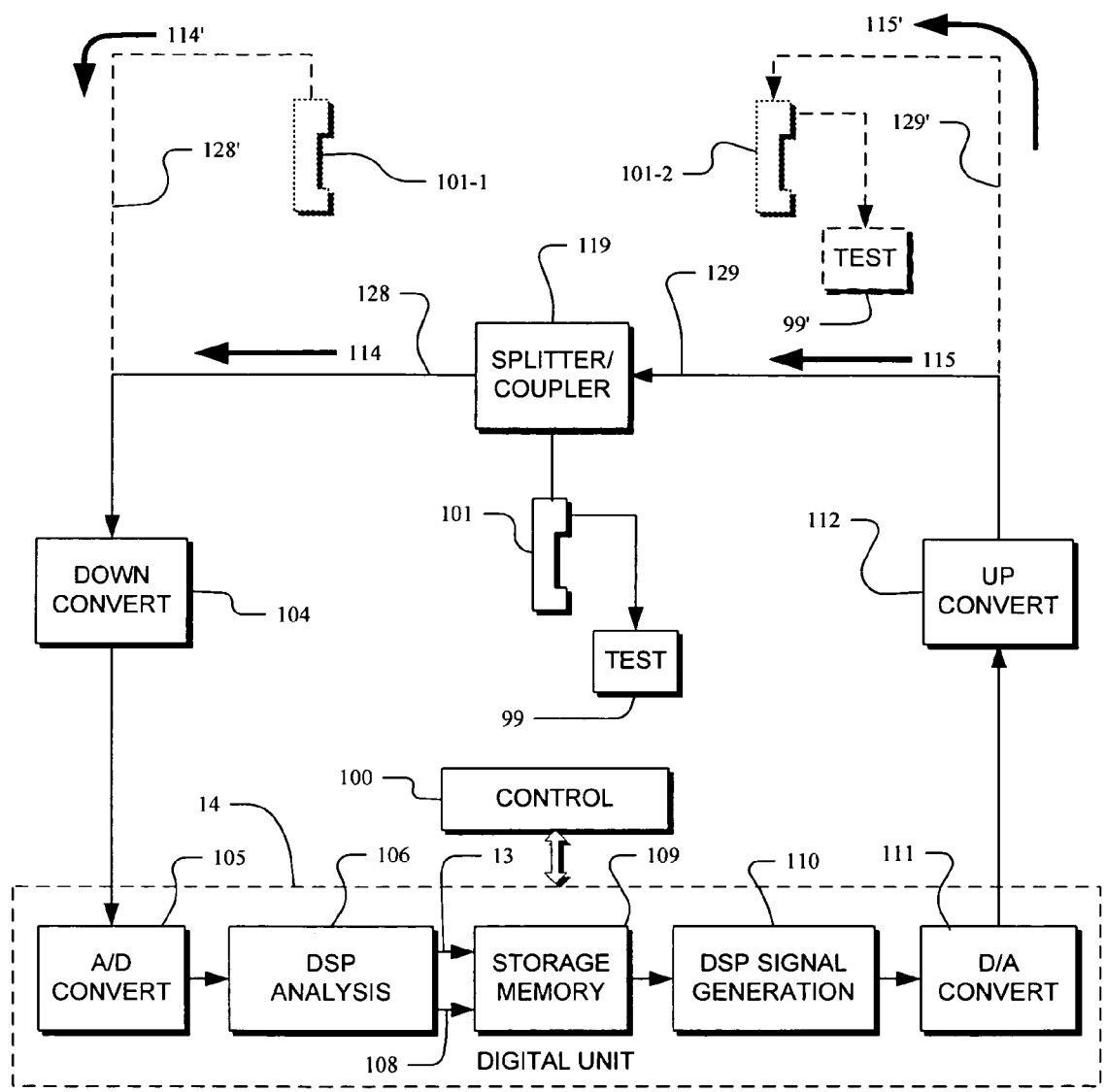
FIG. 4 shows how the system can be used with a single test radio, as in FIG. 2, connected to the system via wires instead of transmit and receive antennas and alternatively how the system can be used with separate transmit and receive radios, as in FIG. 3, using wires instead of transmit and receive antennas.

FIG. 4 is an example of the FIG. 2 and FIG. 3 systems where transmitters and receivers are in the same radio 101, or in different and the radios 101-1 and 101-1, that do not communicate through an air interface but communicate through a wired interface. In FIG. 4 in the first step, the radio 101 transmits a signal 114 through splitter/coupler 119 to the system down converter 104 via hard-wired line 128. Alternatively, in FIG. 4 in the first step, the radio 101-1 transmits a signal 114' to the system down converter 104 via hard-wired line 128'. The down converter 104 has sufficient bandwidth to capture the entire frequency range of the signal from splitter/coupler 119. In the case of a frequency hop signal, the down converter will has the bandwidth to capture all of the hop frequencies of interest for the radio communication system under test.

The IF output of the converter 104 is digitized with A/D converter 105. The down converter limits the IF signal to reduce aliasing in the A/D converter 105 to an acceptable level. The sample rate is at least twice the highest frequency of the frequency hopped signal with enough bits of resolution to provide the dynamic range to permit analysis.

If the input signal 114 is transmitted at a low radio frequency, the down converter 104 is not necessary. For example, if the highest frequency of the input signal is 30 MHz, the received signal may be sampled directly with a sample rate of 60 Msamples/second or higher to obey the Nyquist criteria. Similarly, alias sampling can be used for signal frequencies that are greater than half the sample rate. For example, if the input signal 114 is from 110-125 MHz, the input signal can be sample at 100 Msamples/second to create a digitized signal on the output of the A/D converter 105 of FIG. 2 from 10-25 MHz.

The digital signal is processed with the digital signal processing (DSP) analysis 106 to extract the frequency 13 and symbols 108. In the case of a frequency hopped signal, this extraction is done independently on each hop.

The storage memory 109 stores the test signal components including a test sequence that is determined by the sequence of each different frequency 13, test symbols 108 and test parameters determined by the DSP analysis 106. The digital signal processing (DSP) generator 110 digitally processes the test sequence, the test symbols and test parameters to form an agile test signal. The test parameters and other inputs are provided in some embodiments by the control 100. If the highest transmitted RF signal frequency is lower than half of the D/A sample rate, up converter 112 is not needed. The agile test signal is D/A converted in D/A converter 111, up-converted in up-converter 112. In one alternative, the up-converted signal 115 is connected over the hard-wired line 129 to splitter/coupler 119 to the receive input of the test radio 101. In another alternative, the up-converted signal 115' is connected over the hard-wired line 129' to the receive input of the test radio 101-2. The agile test signals are generated with specified and known values that enable testing of the radio 101 or radio 101-2 using the modulation method employed by the communication system of the radio 101 or radios 101-1 and 101-2 and the testing is for performance beyond nominal performance. The agile frequency test signals transmitted to the receiving test radio 101 are monitored by test 99, or transmitted to the receiving test radio 101-2 are monitored by test 99' to test the proper functionality of radio 101 or radio 101-2 in response to the test signals. The radios 101, 101-1 and 101-2 are typically frequency hop radios and the test signals are frequency hopped signals that have been generated with signal parameters at specified and known values.

Figure 5:
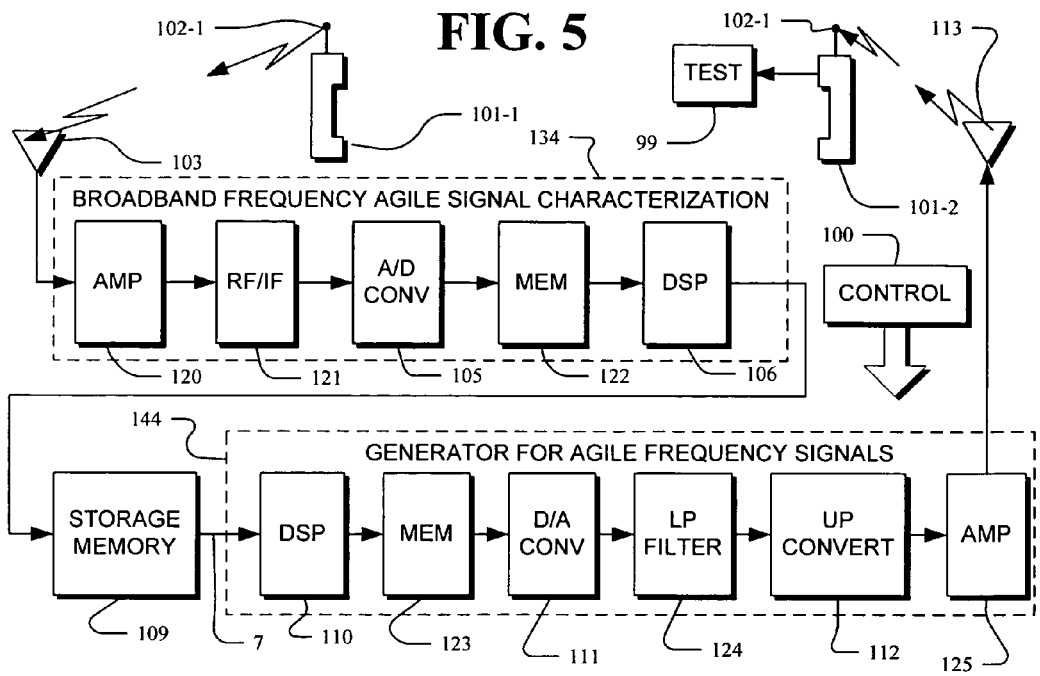
FIG. 5 presents details of the signal receive and analysis subsystems.

In FIG. 5, the unit 134 performs broadband frequency agile signal characterization on the signals from radio 101-1. An input signal from radio 101-1 is received by the agile signal characterization unit 134 through a receiving antenna 103. The receiving antenna 103 captures the radio frequency signal transmitted through the air interface by antenna 102 of radio 101-1. When transmitted through the air interface, the input signal will likely require amplification by amplifier 120. However, if the received input signal is within the proper amplitude range, the amplifier 120 can be eliminated. The signal from the amplifier 120 is down converted, when necessary, by the radio frequency to intermediate frequency converter, RF/IF 121, to provide an input to the A/D converter 105. After down conversion in RF/IF 121, when required, the resulting converted signal is digitized in A/D converter 105 to form a digitized signal. The sample rate of the A/D converter 105 is at least twice the highest frequency of the frequency hopped signal with enough bits of resolution to provide a dynamic range that permits analysis. With a direct-wired connection, 8 bits of resolution are sufficient. Using antennas, as shown in FIG. 5, that are subject to environmental interference signals and noise, at least 12 bits of resolution are preferred. The digitized signal is stored in the memory 122 where it becomes available for processing by the digital signal processor (DSP) 106.

In FIG. 5, the radio 101-1 has the same specifications as the radio 101-2. The radio 101-1 produces a radio frequency input signal which is captured and processed for broadband analysis by signal processing components. The broadband analysis performed commences using an amplitude component to determine the start and stop times of each of the segments of the input signal. For each segment identified by the amplitude component, a frequency component determines the frequency of the segment. A signal component converts each input segment having an input form to a converted segment having a converted form. The converted form facilitates further processing. An analysis of the converted segment is performed using a parameter component to determine signal parameters of each segment individually and to determine signal parameters of multiple segments collectively so as to characterize the input signal.

The analysis performed in FIG. 5 occurs without requiring prior knowledge of the radio specifications, protocols, standards or other similar information about the radio 101-1. Accordingly, the FIG. 5 analysis is particularly suitable for analyzing radios that are not operating within their specifications or that are otherwise operating poorly, for analyzing unknown signals and for analyzing signals without need for knowledge of the radio specification.

In FIG. 5, the generator for agile frequency signals 134 uses the signal components stored in storage memory 109 to generate agile frequency signals. The digital signal processor 110 performs the processing to create the agile signals and stores the results in memory 123. The test parameters and other inputs are provided in some embodiments by the control 100. The results from memory 123 are converted to analog signals in D/A converter 111, filtered in low pass filter 124 up-converted in converter 112 (if necessary), amplified in amplifier 125 and transmitted through antenna 113 to antenna 102-2 of test radio 101-2. The received test signal in radio 101-2 is tested by test 99.

Figure 6:
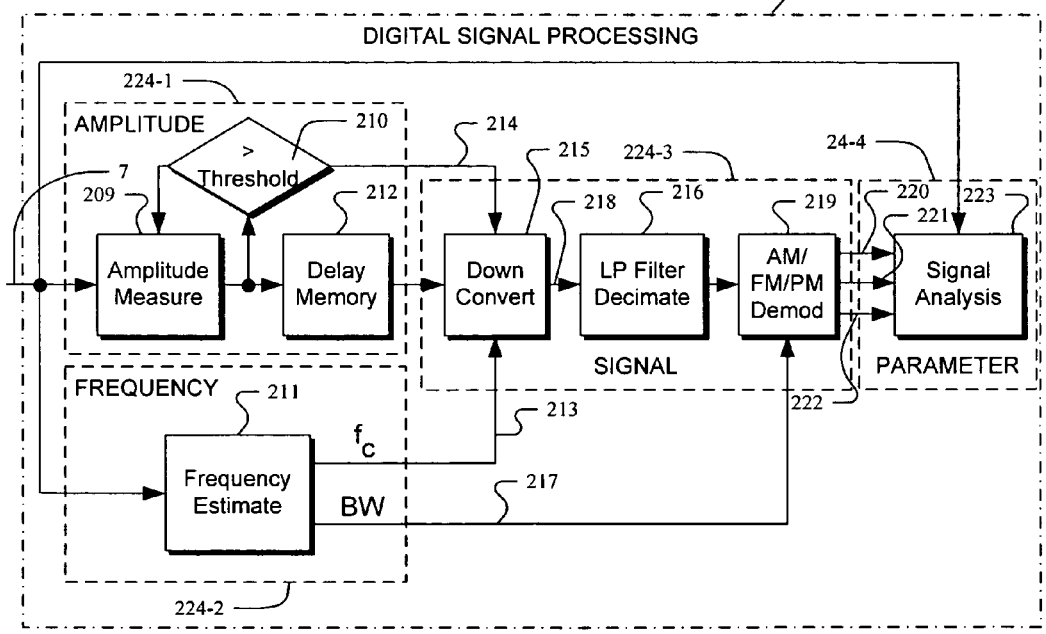
FIG. 6 presents details of the signal generation and transmit subsystems.

In FIG. 6, the AMPLITUDE component 224-1 determines the amplitude of the input signal appearing on the output 7 from the front end unit 229 of FIG. 5 using the amplitude measurement block 209. Various algorithms may be used in measurement block 209 to measure the amplitude of the input signal. One efficient algorithm takes the absolute value of the digitized signal on the output 7. The threshold detector 210 functions between hops to detect a burst by detecting the first sample that exceeds the threshold. At this point, the threshold detector 210 is disabled or ignored until the signal analysis indicates the burst has stopped.

In parallel with AMPLITUDE component 224-1, the FREQUENCY component 224-2 determines the frequency of the input signal appearing on the output 7 from the storage memory 109 of FIG. 5. The frequency, $f_c$, is measured in the frequency estimation block 211 and appears at output 213. The frequency estimation block 211 also estimates the bandwidth, BW, and that estimate appears at output 217. The measurements in frequency estimation block 211 will be in error when the signal level of the input signal appearing on output 7 is too low. When the signal level exceeds a threshold established by the threshold unit 210 the frequency estimate on output 213 is valid and is then used as the carrier frequency in the down conversion process 215. If information is known about the channel frequencies of the input signal, in one embodiment, the frequency estimate 213 is rounded to the nearest channel center and the bandwidth 217 is set to the known bandwidth.

Various algorithms can be used to determine the frequency estimate at output 213. Spectral analysis using a Fast Fourier Transform, FFT, or similar algorithm, is a robust embodiment that uses substantial processing power and requires substantial time to execute. Spectral analysis is preferred when the transmitted signal is received via antennas. With the antenna embodiment, other signals and noise will be intercepted along with the signal from the radio 1. For example, there are a set of military radios that hop from 30-88 MHz. The higher part of this band overlaps with the lower TV channels. By using spectral analysis in the frequency estimation block 211, the TV and other unwanted signals can be ignored. Spectral analysis is also advantageous when the signal bandwidth is to be estimated.

Figure 7:
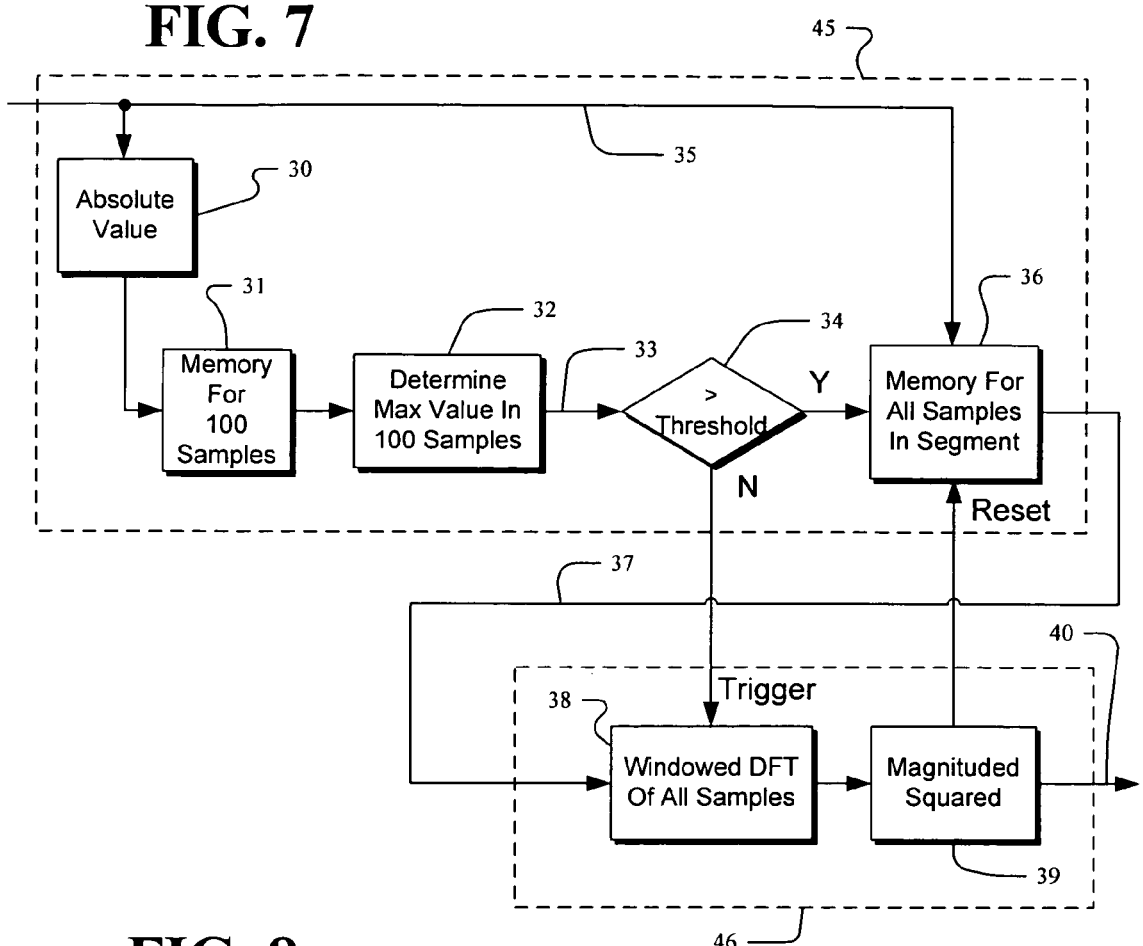
FIG. 7 shows the digital signal processing used to identify the samples associated with the signal segment and to calculate the power spectrum of the segment.
Figure 8:
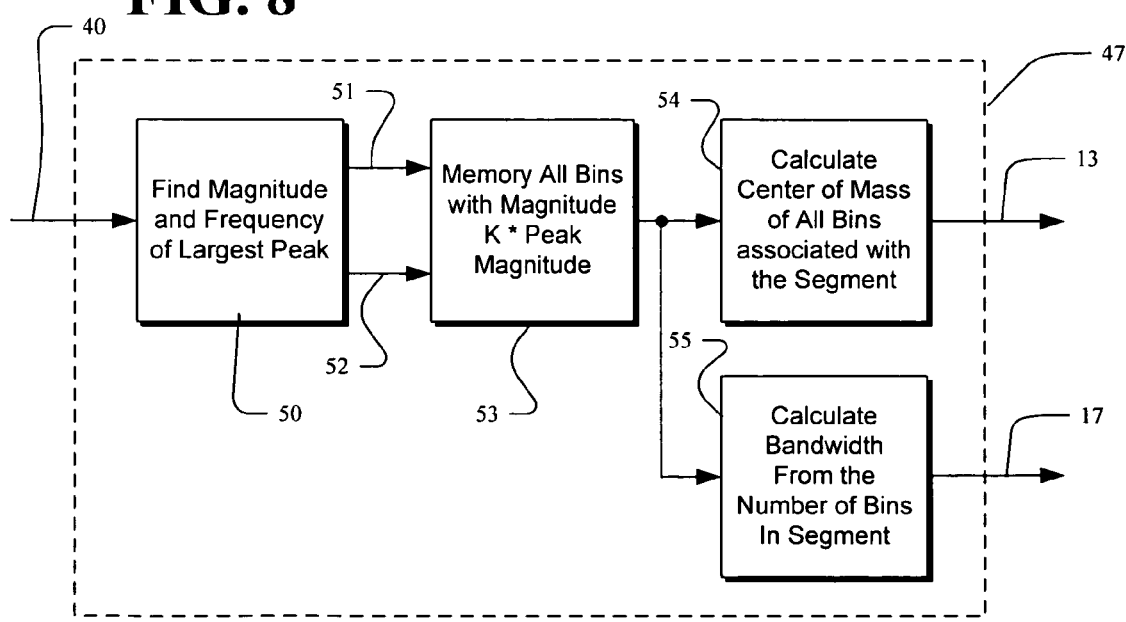
FIG. 8 shows the digital signal processing used to calculate the carrier frequency and the bandwidth of the segment.

One preferred embodiment the frequency estimation block 211 uses the algorithm in FIG. 7 and FIG. 8 which represent the digital signal processing used in the preferred embodiment to calculate the carrier frequency, $f_c$, of each signal segment. FIG. 7 shows the digital signal processing used to identify the samples associated with the signal segment and to calculate the power spectrum of the segment. FIG. 8 represents the digital signal processing used to calculate the carrier frequency and the bandwidth of the segment.

Referring to FIG. 7, the absolute value, in block 30, of the input signal 7 is calculated on each sample and stored in a buffer memory 31. When 100 samples are collected, the maximum value is determined in block 32. If this value is greater than a threshold, determined in block 34, the signal is considered active and the samples at 35, corresponding to the 100 absolute value samples stored in buffer memory 31, are stored in a memory 36 which is large enough to accumulate all samples associated with the signal segment. Once stored in memory 36, the system starts to collect the next 100 samples in buffer memory 31.

When the max value in the 100 sample buffer memory 35 drops below the threshold determined in block 34, the signal estimator 46 is commanded at 37 to calculate the power spectrum on all samples in memory 36. This calculation is done via a windowed digital Fourier transform, DFT in block 38. One preferred embodiment uses a Hamming window; however, other windows also work well. If memory 36 contains N signals, an N point Hamming window is calculated and multiplied with the signal on a sample by sample basis. The N point DFT of the windowed signal is calculated. A subset of the output DFT bins is processed to determine the strongest signal. The subset is bins from 5 to N/2-5. The first few bins near DC do not contain signal energy of interest and are ignored. Samples from N/2 to N-1 are the complex conjugate of samples from 0 to N/2-1 and are ignored as their power spectrum is redundant. Samples from N/2-5 to N/2-1 are ignored because they contain no useful signal energy. If the signal band is known, just the bins associated with this band can be processed to save processing time and to ignore unwanted signals.

The DFT is used instead of an FFT algorithm so the present system can use all of the samples associated with the segment. The signal frequency accuracy is a function of the time duration of the samples in the DFT. Rounding the number of samples, N, to the nearest FFT size would exclude some samples reducing the measurement accuracy. Alternatively, the N samples can be padded with zeros to bring the buffer length to the nearest FFT size greater than N.

The power spectrum 40 of the bin subset is calculated by taking the magnitude squared 39 of the complex DFT output bins as shown in Eq 1. When the time samples in memory 36 have been processed, the memory is reset to start compiling the next segment.

$$P(n) = \sqrt{\text{real}\{bin(n)\}^2 + \text{imag}\{bin(n)\}^2}, \; 5 < n < N/2-5 \qquad \text{Eq 1}$$

The power spectrum bins at 40, P(n), are processed in block 47 to find the frequency at output 13 and bandwidth at output 17 of the strongest peak in the spectrum. The first step in block 50 is to find the bin number, $n_{MAX}$, on output 51 and magnitude on output 52 of the strongest bin, $P_{MAX}$, in P(n) input at 40. The bins below and above $n_{MAX}$ are examined in block 53 to identify all consecutive bins that have sufficient energy. This examination is done by finding all bins that exceed a threshold based on the $P_{MAX}$. A typical threshold is to identify all bins exceeding X dB below the max bin. The first bin exceeding the threshold is $n_{LOW}$ and the last bin exceeding the threshold is $n_{HIGH}$. A typical value of X is around 30 dB. Eq 2 shows the threshold calculation.

$$\text{Threshold} = 10^{(-X/10)} \ast P_{MAX} \qquad \text{Eq 2}$$

The bins associated with the strongest signal, $n_{LOW}$ through $n_{HIGH}$, are processed to determine the signal frequency at output 13 and bandwidth at output 17. The signal frequency is estimated with a center of mass algorithm in block 54 as shown in Eq 3. The signal power is the value of the denominator of Eq 3.

$$fc = \frac{\sum_{n=n_{LOW}}^{n_{HIGH}} \frac{n \ast fs}{N} P(n)}{\sum_{n=n_{LOW}}^{n_{HIGH}} P(n)} \qquad \text{Eq 3}$$

where:
$f_c$=carrier frequency 13 (cycles/second)
$f_s$=sample rate (samples/second)
$n_{LOW}$=first bin associated with the signal segment
$n_{HIGH}$=last bin associated with the signal segment
N=Number of samples used in the DFT
P(n)=Power spectrum bins 40

The signal bandwidth, BW, 17 is calculated with Eq 4.

$$BW = (n_{HIGH} - n_{LOW} + 1) \ast f_s / N \qquad \text{Eq 4}$$

The symbols are also needed to reconstruct the signal for transmission. The first step involved to extract the symbols are to a) down convert the signal segments to baseband using the frequency estimate 13 and the bandwidth calculation 17, b) determine the symbol rate 77 and synchronize to the signal to determine the symbols at each symbol period.

When the transmitter of radio 1 is wired to the present system as shown in FIG. 2, the received signal is free from interference signals from the environment. In this case, a simpler algorithm such as FM demodulation can be used to determine the carrier frequency. This technique can not measure the signal bandwidth.

In FIG. 5, delay memory 12 is used to give the frequency estimation enough signal duration to obtain a reliable estimate so the entire burst can be analyzed without losing the beginning of the signal.

The down converter block 15 multiplies the digitized signal by a digital local oscillator to own convert the signal to baseband using Eq 5. The resultant digital signal at 18 is a complex signal.

$$y_{BB}(k) = y_{IF}(k) \ast [\cos(2\pi f_c k/f_s) - j \sin(2\pi f_c k/f_s)] \qquad \text{Eq 5}$$

where
k=sample number: 0, 1, 2, . . .
$y_{IF}(k)$=k'th sample from memory 8
$y_{BB}(k)$=k'th complex output down converted sample
$f_c$=carrier frequency 13 (cycles/second)
$f_s$=sample rate (samples/second)

The resultant signal at 18 will have one component around 0 Hz and an undesired component centered around $-2 f_c$. The undesired component will be reduced to an acceptable level by lowpass filter 16. The filter 16 will also decimate the sample rate by M where only the M'th output filtered values are calculated by the filter 16. For example, in the case of Bluetooth, the hop frequency band covers 83.5 MHz. This band can be digitized with a 200 Msample/second sample rate. The individual hop channels are 1 MHz wide. It is reasonable to reduce the resultant complex sample rate of the baseband signal at 18 from 200 Msamples/second to around 1.25 M complex samples/second. In this case, the decimation factor M is 200/1.25=160. The low pass digital filter is either an FIR or IIR filter with bandwidth BW as determined at 17.

The baseband signal at 18 is processed to measure many of the signal parameters. The first step in the processing is to demodulate the data. The signal can be AM demodulated as shown in Eq 6, however, other algorithms can be used to generate the AM signal 20.

$$AM(n)=\text{sqrt}[\text{real}\{y_D(n)\}^2+\text{imag}\{y_D(n)\}^2] \quad \text{Eq 6}$$

where
    n=sample number of the decimated samples: 0, 1, 2, . . .
    $y_D(n)$=decimated, filtered baseband complex time samples
    AM(n)=amplitude waveform 20 of the filtered signal
    real=extracts the real part of the complex signal
    imag=extracts the imaginary part of the complex signal Other parameters may require the phase demodulated signal. The phase demodulated signal can be generated with Eq 7; however, other algorithms can be used to generate the phase demodulated signal at output 21.

$$PM(n)=\text{atan2}(\text{real}\{y_D(n)\}, \text{imag}\{y_D(n)\}) \quad \text{Eq 7}$$

where
    n=sample number of the decimated samples: 0, 1, 2,
    $y_D(n)$=decimated, filtered baseband complex time samples
    PM(n)=phase waveform 21 of the filtered signal
    real=extracts the real part of the complex signal
    imag=extracts the imaginary part of the complex signal
    atan2=four quadrant arc tangent function of atan (imag$\{y_D(n)\}$/real$\{y_D(n)\}$)

Other parameters still may require the frequency demodulated signal at output 22. The frequency demodulated signal may be generated with Eq 8, however, other algorithms can be used to generate the FM signal.

$$FM(n)=(f_{sD}/2\pi)(PM(n)-PM(n-1)) \quad \text{Eq 8}$$

where
    n=sample number of the decimated samples: 0, 1, 2,
    PM(n)=phase waveform 21 of the filtered signal
    FM(n)=frequency waveform 22 of the filtered signal (cycles/second)
    $f_{sD}$=decimated sample rate (samples/second)=$f_s/M$ Since the FM signal at 22 is derived from the derivative of the PM signal at 21, any high frequency noise in the PM signal at 21 will be magnified in the FM signal at 22. It is common to low pass filter the PM signal to reduce the high frequency noise. It is also common to low pass filter the AM signal at 20 and FM signal at 22 to allow more accurate measurements to be made.

If the signal is PSK, the PM waveform at 21 is used to measure the modulation—degrees per symbol state. For example a QPSK signal changes 90 degrees per symbol state. The PM waveform can be used to measure the signal symbol rate, symbol rate drift, modulation depth, jitter, phase accuracy, the symbols and other parameters.

If the signal is FSK, the FM waveform at 22 is used to measure the frequency deviation of the symbol states. The FM waveform is used to measure the signal symbol rate, symbol rate drift, modulation depth, jitter, phase accuracy, the symbols and other parameters.

The symbol rate is a key parameter to all digital signals. Various algorithms can be used to calculate the symbol rate including spectral analysis, correlation and time of transition (TOT) analysis. It is desired to calculate the bit rate independently on each signal segment. TOT analysis is selected as being the most accurate with the short amount of data available in the signal segment. The algorithm that follows is for an FSK signal, however, it is easily adapted for ASK and PSK signals.

Figure 9:
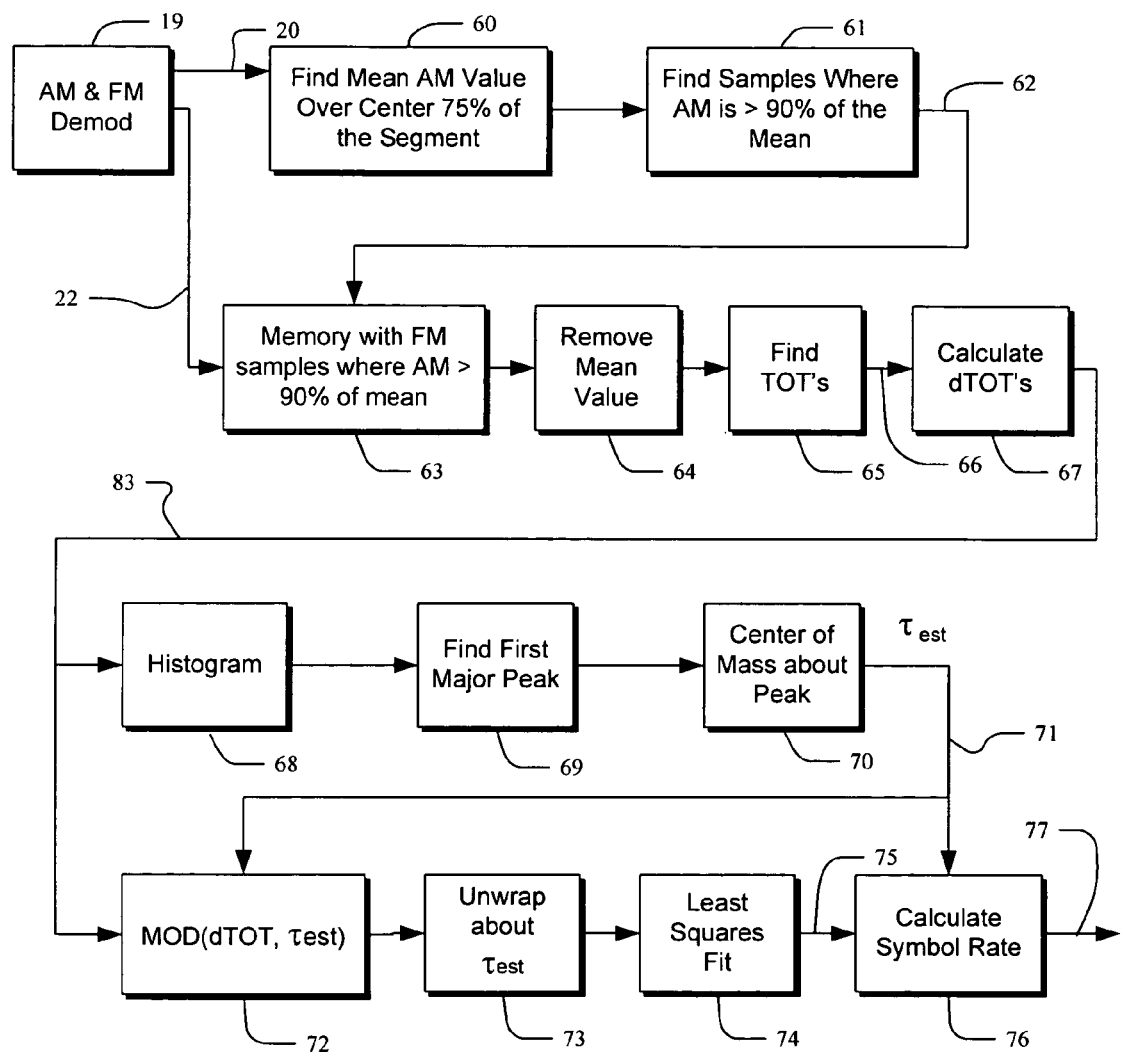
FIG. 9 is a block diagram of the digital signal processing algorithm used to calculate the signal symbol rate.

FIG. 9 shows the algorithm used to calculate the symbol rate on an FSK signal at 22. The first step in block 60 is to analyze the AM signal at 20 to determine the mean amplitude over the center 75% of the center of the segment. The sample numbers at 62 are identified where the AM signal for the segment exceeds 90% of the mean value. The FM samples associated with these AM sample numbers are stored in memory 63 for processing.

The next step 64 is to remove the mean value of the FM samples. Next the times of each zero crossing 66, TOT, are calculated in block 65 by interpolating the time of the samples on either side of the zero crossing. The first difference at 83 of the TOTs are calculated in block 67: dTOT(k)=TOT(k)−TOT(k−1) for all TOTs in the burst.

Figure 15:
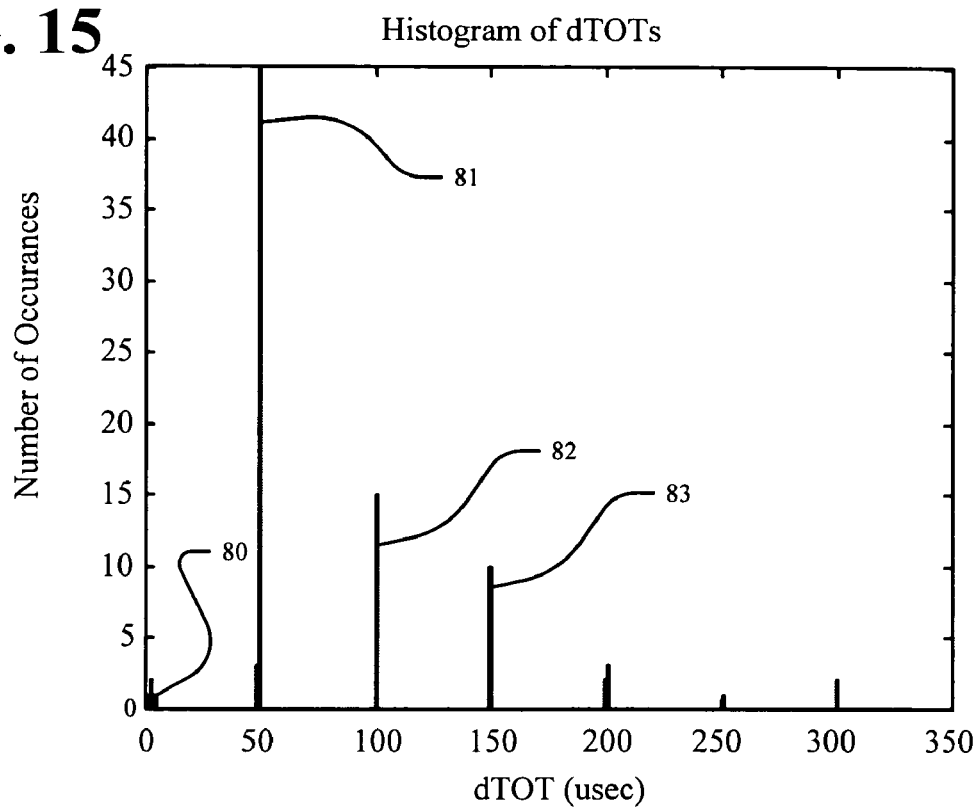
FIG. 15 depicts a histogram of dTOT values as compiled and analyzed to show the first major peak and following peaks.
Figure 16:
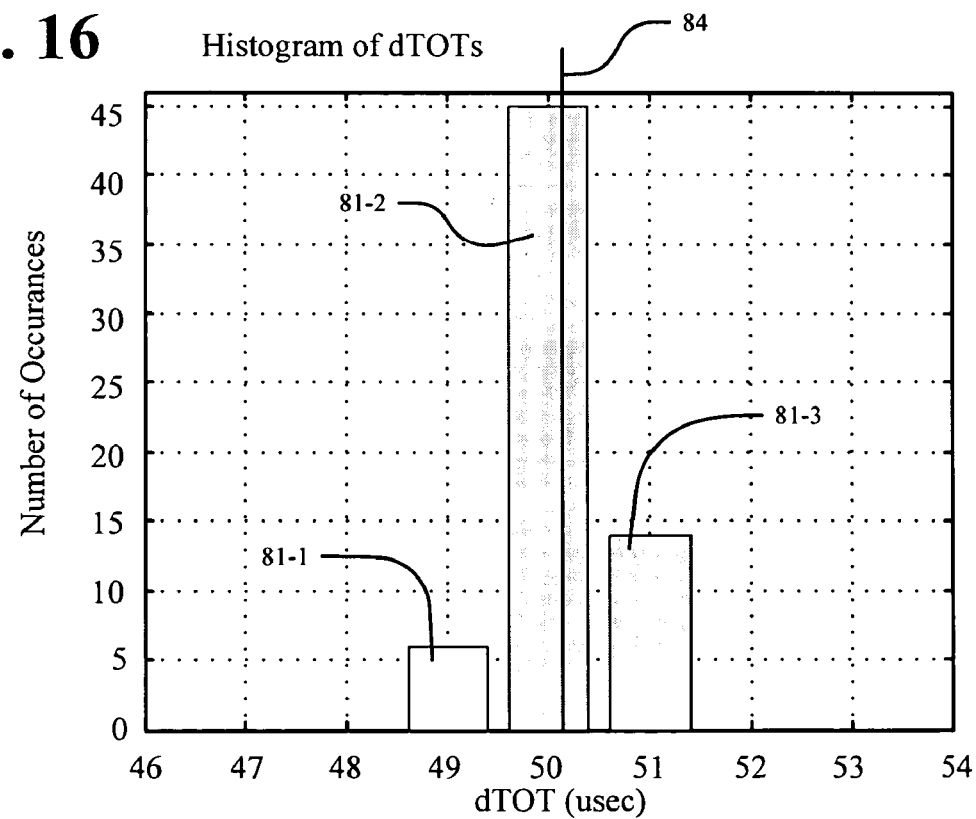
FIG. 16 shows an expansion of the first major peak of FIG. 15 with three bins used to find the center of mass of the histogram.

A histogram of the dTOT values is compiled at 68 and analyzed to find the first major peak 81, $b_{MAX}$ in block 69. FIG. 15 shows an example of this histogram. There may be stray zero crossings with very short TOT in noisy data that is to be ignored 80. Harmonic peaks will be present at 2× 82, 3× 83, etc. of the fundamental symbol period due to double, triple, etc symbols with the same symbol value. FIG. 16 shows an expansion of the first major peak 81 with bins 81-1, 81-2 and 81-3 at dTOT=49, 50 and 51. The center of mass 84 of the histogram will be the estimate in block 70 of the symbol rate, $\tau_{est}$, at 71. This estimate is calculated using histograms from about 0.9*$b_{MAX}$ to 1.1*$b_{MAX}$ which are calculated as shown in Eq 9. In the example of FIG. 16, the center of mass 84 is (6×49+45×50+14×51)/(6+45+14)=50.12 usec.

$$\tau_{est} = dBin \frac{\sum_{b=.9b_{MAX}}^{1.1b_{MAX}} bHist(b)}{\sum_{b=.9b_{MAX}}^{1.1b_{MAX}} Hist(b)} \quad \text{Eq 9}$$

where:
    dBin=histogram bin width (seconds)
    Hist(b)=histogram array with bins b
    $b_{MAX}$=bin number of first major histogram peak
    $\tau_{est}$=estimated symbol period (seconds)

The modulo of the dTOT values at 83 and the estimated symbol rate, $\tau_{est}$, at 71 is calculated in block 72 to remove the double, triple, etc symbols from the dTOT values. An unwrap algorithm is used to correct for +/−$\tau_{est}$ errors as shown in the Matlab code of TABLE 2 below. This unwrap algorithm is used if the symbol rate estimate is in error enough so the mod(dTOT) values drift beyond $\tau_{est}$.

TABLE 2

| Code | Comment |
|---|---|
| correction = 0; | % wrap correction factor |
| for k = 2:nTOTs; | % process all TOTs |
|     dTOT = TOT(k) − TOT(k−1); | % calculate the first difference |

TABLE 2-continued

| Code | Comment |
|---|---|
| mod_dTOT = mod(dTOT, tauEst); | % calculate the modulo with the symbol rate estimate |
| if mod_dTOT − lastMod_dTOT > tauEst/2; | % value took too high a step indicating wrap around |
| correction = correction + tauEst; | % |
| end | % |
| if mod_dTOT − lastMod_dTOT < −tauEst/2; | % value took too high a step indicating wrap around |
| correction = correction − tauEst; | % |
| end; | % |
| mod_dTOT = mod_dTOT − correction; | % |
| end; | % |

The resultant mod_dTOT values are fitted to a straight line with a least squares fit 74. The resultant slope 75, m, is used 76 to produce the final symbol rate measurement 77 as shown in Eq 10.

$$\tau_{SYM} = \tau_{est}(1+m) \qquad \text{Eq 10}$$

Figure 10:
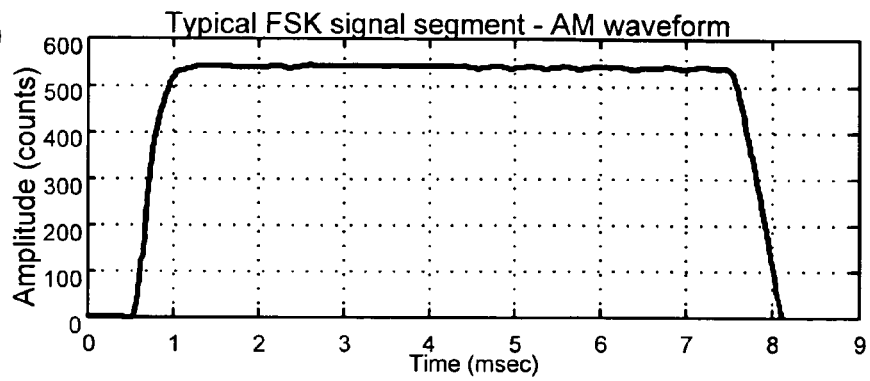
FIG. 10 is a typical AM waveform for an FSK signal segment.
Figure 11:
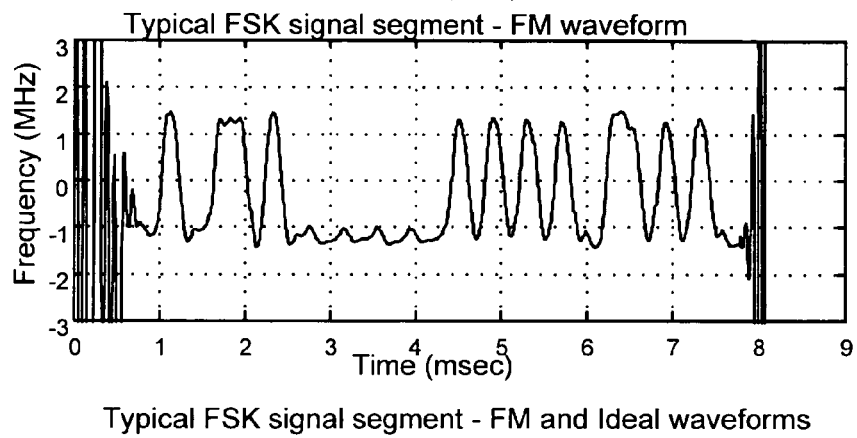
FIG. 11 is a typical FM waveform for an FSK signal segment.
Figure 12:
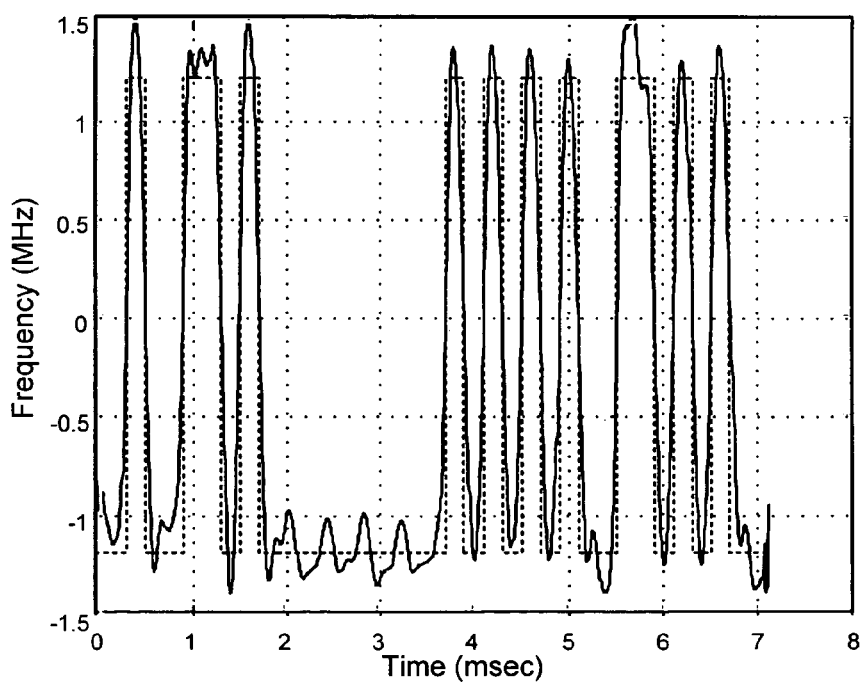
FIG. 12 is a typical FM waveform and the idealized representation of the waveform.

The symbol rate is reported to the user. The symbol rate is also used to decode the individual symbol values and to determine the symbol rate jitter statistics. The first step in this process is to reconstruct the ideal waveform from the signal. A typical result is shown in FIG. 12 with the FM waveform (shown solid) and the ideal waveform (shown dashed) superimposed, this is the same signal shown in FIG. 10 representing the FM samples in memory 63. The data shown in FIG. 11, FIG. 11 and FIG. 12 are the AM and FM demodulated data of the first signal hop H1 shown in FIG. 13. The spectrogram analysis shown in FIG. 13 and FIG. 14 are good for overall visual analysis, however, they lack the time and frequency resolution for detailed signal analysis. The ideal waveform is calculated to have the same modulation depth, mean FSK mark and space frequency offsets in this case, the symbol rate at 77 and is synchronized in time to the FSK waveform at 22 (see FIG. 5). The jitter is the error between the TOT from the FM waveform and that from the ideal, calculated waveform.

The symbol rate is to decode the individual symbol values. To do this, the time of each zero anticipated symbol transition is calculated from the symbol rate. The time for the ideal first time of transition is calculated with Eq 11 using the dTOT values 73 and the final symbol rate 77.

$$\text{Time Offset} = \text{MOD}(dTOT, \tau_{SYM}) \qquad \text{Eq 11}$$

The demodulated waveforms in this system are sufficiently over sampled to provide over 10 samples per symbol. The sample at the midpoint of each symbol is determined from the symbol rate and the time offset. The midpoint sample and the samples on either side of this sample are averaged to form the modulation value of the symbol. This is converted to symbol values. In the case of a binary modulation such as common ASK and FSK signals or BPSK signals, the symbol values are arbitrarily assigned to be a "1" if the modulation state is low and to a "0" if the state is high.

The resultant symbols 108 and the hop frequency 13 are stored in storage memory 109 for future use in reconstructing the signal for transmission. Memory 109 is, for example, a computer disk drive.

FIG. 6 shows the steps used to generate the signal transmitted to a radio under test. This radio can either be the same radio used to transmit the signal 101-1 or to a second radio 101-2 of the same specification. The first step is for a processor 110 to read the hop information 13 and 108 from memory 109 along with the signal parameters 131 from the system operator. These parameters include carrier frequency error, bit rate error, rise and fall times, amplitude ripple and roll off, modulation depth, nonlinearities, burst duration, burst start time and burst interval. Signal interference can be added to the signal including tones, other signals, noise and other signals of the same as the test radio.

Figure 17:
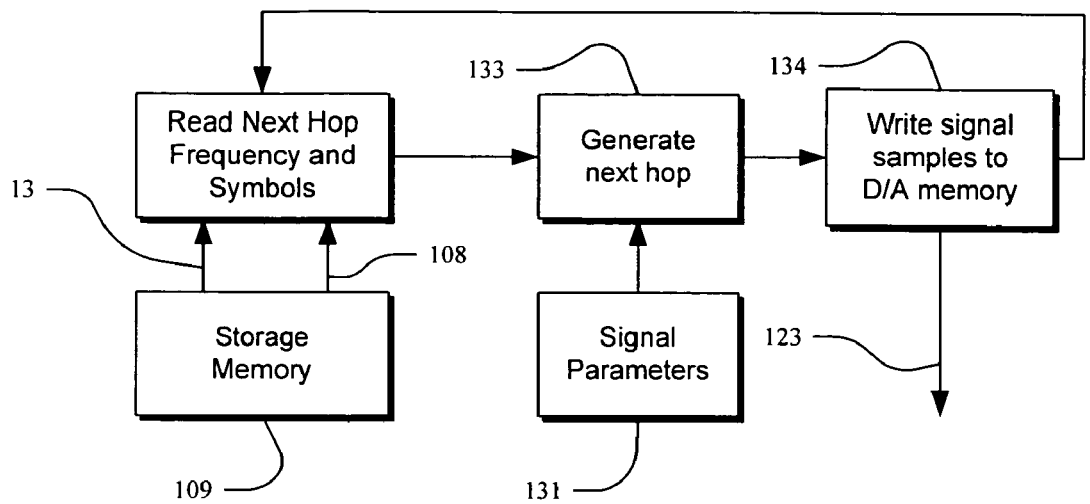
FIG. 17 shows the details of the process to regenerate the frequency hop signal.

FIG. 17 shows the detailed steps to generate the signal to transmit. The first step is for the processor to read the signal parameters 131 from the user. This can be done via command line interface, GUI, text files, etc. Some parameters are universal applying to all frequency hop signals, these include carrier frequency error, burst rise time and fall times, rise and fall amplitude vs. time functions, amplitude variation vs. frequency function, symbol rate, symbol rate jitter, hop duration and RMS duration error, hop to hop interval and RMS interval error and interference signal types, frequencies and amplitudes.

Other parameters are unique to the signal type being generated. For example, an FSK signal will require information on the nominal frequency offset for the two states along with the RMS frequency error, the bandwidth of the modulated signal, symbol structure such as if the burst comes up with an unmodulated carrier or starts with the first symbol, are the symbols phase continuous, frequency overshoot at symbol transitions, etc.

Once the system has the signal parameters, it can start to build the signal. The system reads the first hop frequency 13 and symbol set 108 stored earlier in memory 109. These values are used by the generation process 133, along with the signal parameters, to generate the digital signal time samples. The details of this generation process are unique to each signal type. For example, a Bluetooth FSK signal may be generated with different algorithms than a military SINC-GARS FSK signal. The processes to generate each of these signals are provided by the physical layer specifications of the individual radios and signals. Generically this process consists of generating a carrier modulated with the symbols at the symbol rate specified, filtering the resultant carrier, frequency converting to the hop frequency 13, converting from complex to real data if necessary and scaling the amplitude for output to the D/A.

The signal generation process can add in interference signals and noise. The interference signals can be simple as tones or complex signals. For example Bluetooth operates in the 2.4 GHz ISM band that is also used by many other systems including 802.11b/g wireless networks, cordless phones and microwave ovens. Each of these can produce harmful interference signals. The present system can simulate these signals and add them to the generated signal. These interference signals can be added in either digitally on the digital signal in generator 110 or with analog signal generators and summing circuits following the D/A converter 111. The interference could also be another radio of the same type as the test radio operating in the same frequency band.

The system can generate and add noise to the generated signal. This will simulate receiving a weak signal that can have significant background noise. This noise is typically white Gaussian noise. The noise can be added in either digitally on the digital signal in generator 110, or with an analog noise generator summed in to the signal after the D/A converter 111.

The system can change the amplitude of the signal dynamically to simulate the fading that is encountered by moving transmitter or receiver. At some frequencies rain can cause fading that can be simulated. The fading can be produced either digitally on the digital signal in generator 110, or in analog with variable attenuators after D/A converter 111.

The form of the signal could be either real or complex values. In the preferred embodiment, the samples are real values at a baseband IF frequency band.

The resultant time samples are written to the D/A memory and the D/A is commanded to start playing the data in memory. After the first hop is generated, the system returns to read the data on the next hop 13 and 108 and continues.

The radio receiver 101 or 101-2 is monitored at 99 to determine if it detected and processed the signal properly. This monitoring can be as simple as the operator listening to the radio speaker to determine if the same voice message sent 114 was received 115 and heard properly.

The monitoring could be automated with some radios where a specific digital message is transmitted 114, processed by the system and retransmitted 115 to radio. The radio 101 or 101-1 output is compared against the transmitted digital message to detect any bit or symbol errors. Some radios produce diagnostics that can be used to determine any issues with receiving and processing the transmitted signal.

Figure 18:
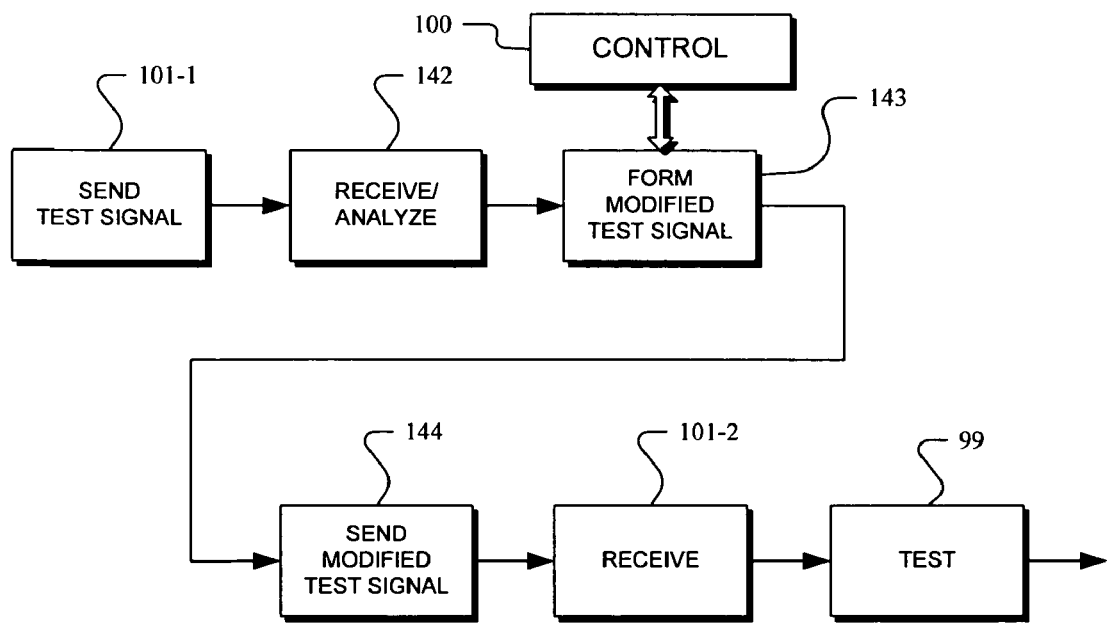
FIG. 18 shows the process to record, correct and play a signal from a defective radio and test it on a receive radio.

In FIG. 18, a sequence of tests is performed. First the send test signal at 101-1 sends a test signal like the transmission from radio 101-1 in FIG. 3, for example. The test signal is received and analyzed in 142. Based upon the analysis, a modified test signal is formed at 143 under control of control 100. The send modified test signal sends a test signal and the test signal is received at 101-2, like the reception of radio 101-2 in FIG. 3 and the reception by the radio is tested at 99. The sequence of FIG. 18 is repeated as many times as is useful whereby sequential modification of the test signals occurs to determine what elements of a radio's operation are causing problems.

While the invention has been particularly shown and described with reference to preferred embodiments thereof it will be understood by those skilled in the art that various changes in form and details may be made therein without departing from the scope of the invention.

The invention claimed is:

1. A test system including a generator for generating an agile frequency test signal for testing a test radio where the test radio has specifications for operating in a communications system comprising,
   a signal component source for providing signal components including test parameters and including a test sequence and test symbols derived from radio transmissions of the communications system,
   a signal generator for digitally processing the test sequence, the test symbols and test parameters to form an agile test signal,
   a transmitter for transmitting the test signal to the test radio.

2. The system of claim 1 wherein the test system extracts the signal components from the transmission of a transmitting radio for the communications system.

3. The system of claim 2 wherein the transmitting radio is the test radio.

4. The system of claim 2 wherein the transmitting radio is different from the test radio and wherein the test radio has the same specifications as the test radio.

5. The system of claim 1 wherein the component source includes a memory for storing digital values of the signal components.

6. The system of claim 1 wherein the test sequence is a hopping sequence and the test radio is a frequency hopping radio.

7. The system of claim 6 wherein signal hop frequencies and message symbols are extracted from the transmission of a transmitting radio for the communications system.

8. The system of claim 1 where the test signal is generated as an analog signal with a digital to analog converter.

9. The system of claim 8 where the analog signal is up-converted to a higher frequency for transmission to the test radio.

10. The system of claim 1 where the test radio is monitored to determine performance in response to the agile test signal.

11. The system of claim 1 where the test signal is transmitted by a transmit antenna to a receive antenna of the test radio.

12. The system of claim 1 where the test signal is transmitted by a transmit wired connection to a receive wired connection of the test radio.

13. The system of claim 1 where interference signals are added to the test signal.

14. The system of claim 1 where noise is added to the test signal.

15. The system of claim 1 where a signal amplitude of the test signal is faded.

16. A test system including a generator for generating an agile frequency test signal for testing a test radio where the test radio has specifications for operating in a communications system and wherein said test radio is a frequency hop radio comprising,
   a signal component source for providing signal components including test parameters and including a test sequence and test symbols derived from radio transmissions of the communications system,
   a signal generator for digitally processing the test sequence, the test symbols and test parameters to form an agile test signal and where said test signal is generated with a set of specified signal parameter values, a sequence of hop frequencies and message symbols that produce a known output from the test radio when the test radio is operating properly,
   a transmitter for transmitting the test signal to the test radio.

17. The system of claim 16 wherein the component source extracts the signal components from the transmission of a transmitting radio for the communications system.

18. The system of claim 16 wherein the transmitting radio is the test radio.

19. The system of claim 16 wherein the transmitting radio is different from the test radio and wherein the test radio has the same specifications as the test radio.

20. The system of claim 16 wherein the component source includes a memory for storing digital values for the signal components.

21. The system of claim 16 wherein the test sequence is a hopping sequence and the test radio is a frequency hopping radio.

22. The system of claim 16 where signal hop frequencies and message symbols are extracted from the transmission of a transmitting radio for the communications system.

23. The system of claim 16 where the test signal is generated as an analog signal with a digital to analog converter.

24. The system of claim 23 where the analog signal is up-converted to a higher frequency for transmission to the test radio.

25. The system of claim 16 where the test radio is monitored to determine performance in response to the agile test signal.

26. The system of claim 16 where the test signal is transmitted by a transmit antenna to a receive antenna of the test radio.

27. The system of claim 16 where the test signal is transmitted by a transmit wired connection to a receive wired connection of the test radio.

28. The system of claim 16 where interference signals are added to the test signal.

29. The system of claim 16 where noise is added to the test signal.

30. The system of claim 16 where a signal amplitude of the test signal is faded.

31. A test system including a generator for generating an agile frequency test signal for testing a test radio where the test radio has specifications for operating in a communications system comprising,
　a receiver for receiving a frequency hopping radio input signal transmitted in the communications system, said input signal having segments at different hopping frequencies and different hopping times,
　a broadband processor for processing said input signal to determine signal components, and for each segment,
　　determining from the input signal a hopping time of the segment,
　　determining from the input signal a frequency of the segment, and
　　determining signal parameters,
　a signal component memory for storing said signal components including a test sequence, test symbols and test parameters,
　a signal generator for digitally processing the test sequence, the test symbols and test parameters to form an agile test signal,
　a transmitter for transmitting the test signal to the test radio.

32. The system of claim 31 where said processor extracts message symbols from said input signal.

33. The system of claim 32 where the message symbols are extracted from each hop.

34. The system of claim 31 where said processor extracts a carrier frequency from each hop.

35. The system of claim 31 where the test signal from said signal generator is processed with a digital to analog converter to form an analog test signal.

36. The system of claim 35 where the analog signal is up converted to a higher frequency for transmission to the test radio.

37. The system of claim 31 where the test radio is monitored to determine performance in response to the test signal.

38. The system of claim 37 where the test radio performance is determined by an operator manually.

39. The system of claim 37 where the test radio performance is determined with an automated system.

40. The system of claim 31 where interference signals are added to the test signal.

41. The system of claim 31 where noise is added to the test signal.

42. The system of claim 31 where a signal amplitude of the test signal is faded.

* * * * *